United States Patent [19]

Mertens

[11] Patent Number: 4,799,326

[45] Date of Patent: Jan. 24, 1989

[54] FISH HOOK EYE CLEANER

[76] Inventor: Miles A. Mertens, P.O. Box 1753, Fond du Lac, Wis. 54935

[21] Appl. No.: 939,317

[22] Filed: Dec. 8, 1986

[51] Int. Cl.$^4$ ............................................. A01K 97/00
[52] U.S. Cl. .......................................... 43/4; 30/363; 294/99.2
[58] Field of Search ............... 43/4; 294/99.2; 30/363, 30/361, 366, 124

[56] References Cited

U.S. PATENT DOCUMENTS

| | | | |
|---|---|---|---|
| 266,007 | 10/1882 | Badger | 294/99.2 |
| 745,071 | 11/1903 | McKibben | 294/99.2 |
| 753,936 | 3/1904 | Tull | 30/363 |
| 1,331,851 | 2/1920 | Auzoun Boghossian | 294/99.2 |
| 2,079,672 | 5/1937 | Allen et al. | 294/99.2 |
| 2,839,325 | 6/1958 | Jeanfavre | 294/99.2 |
| 3,496,807 | 2/1970 | Jones et al. | 294/99.2 |
| 4,053,979 | 10/1977 | Tuthill | 30/124 |
| 4,330,936 | 5/1982 | Swarth | 30/124 |

Primary Examiner—Nicholas P. Godici
Assistant Examiner—Karen Skillman
Attorney, Agent, or Firm—Wheeler Law Firm

[57] ABSTRACT

A tong-like device which contains a bottom strip with an opening through which a fishing jig eye can be inserted and a top strip which has a tab with a point which can be pressed down so that the top tab passes behind the bottom tab and the point passes through the jig eye removing any materials therein. The end of the device where the upper and lower strips meet may be coated with plastic.

5 Claims, 2 Drawing Sheets

FISH HOOK EYE CLEANER

BACKGROUND OF THE INVENTION

Fishing jigs which are coated with plastic or paint, frequently have eyes which are filled up with coating material as a result of the coating process. In order for a line to be passed through such an eye, the fisherman has to have a sharp instrument handy to clear the hole. Generally, this sort of instrument would be a fishing hook. Additionally, a fisherman is faced with the problem that if the instrument is thin enough to clear the eye, it is generally so small that it is hard to handle, easy to lose, and not capable of clearing the entire eye satisfactorily. Also in the case in which the sharp instrument is a fishing hook, the hook may be dulled.

The present invention has the advantages of being easy to use, and being able to completely clear the eye of the jig. While its basic structure is simple, and it has been used before in devices like tweezers or tongs, the distinguishing features of the present invention: its hole used to position the eye of the lure, its point to clear the eye of the lure, and its coated end which makes for easy handling, make the present invention a useful new tool for fishermen.

SUMMARY OF THE INVENTION

The present invention discloses a device which is comprised of two bent strips which are joined together. Although the present invention is described in terms of being composed of two separate strips, the two strips of the invention may merely be sections of one longer strip of stiff material which has been bent into the appropriate shape. The bottom strip includes a tab which has an opening or hole through which a fishing jig can be inserted and positioned. The top strip includes a tab which has a point on its lower edge. The two tabs pass near one another rather than being aligned so that when the eye of the jig is properly positioned in the opening or hole and the two strips are pressed together, the point on the top tab passes through the eye of the jig pushing out any materials therein. Although the invention is described as being used to clear the eyes of fishing jigs, it may also be used to clear the eyes of lures and hooks in general. It will be understood that the words "top" and "bottom" refer to the normal orientation of the device in use, but that any orientation is practical. These are merely convenient terms to identify the different parts and their relationship to each other.

DRAWINGS

DETAILED DESCRIPTION

Although the disclosure hereof is detailed and exact to enable those skilled in the art to practice the invention, the physical embodiments herein disclosed merely exemplify the invention which may be embodied in other specific structure. While the best known embodiment has been described, the details may be changed without departing from the invention which is defined by the claims appended hereto.

Figure 1:
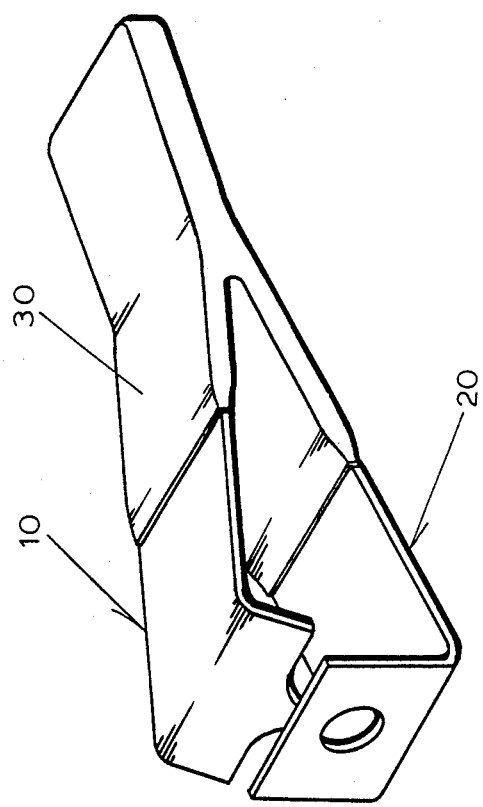
FIG. 1 shows a right front perspective of the invention.
Figure 2:
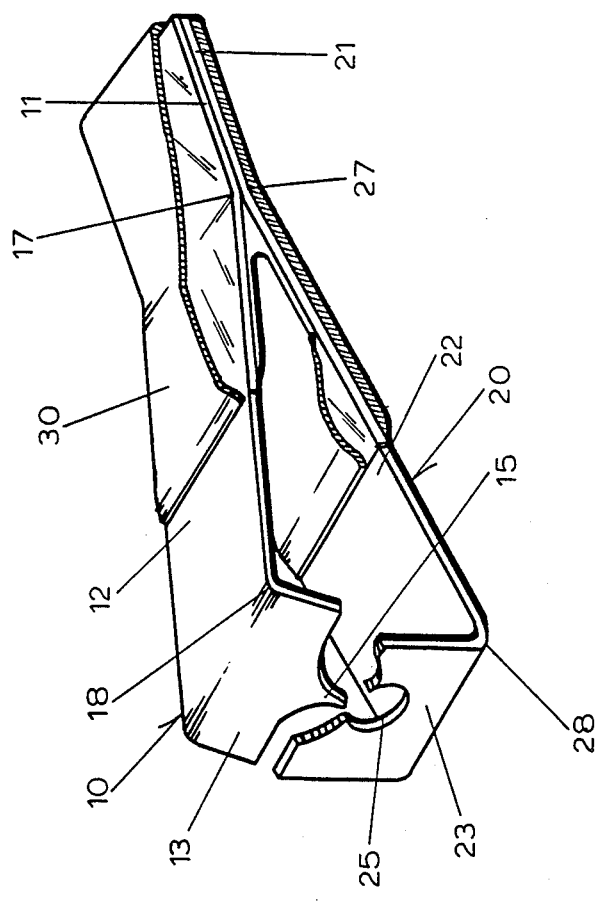
FIG. 2 shows a right front perspective view of the invention in which the plastic that coats one end of the invention has been broken away to show how the two strips which are coated by the plastic are joined and part of the tab with an opening is broken away to show the point on the other tab.

Referring now to FIGS. 1 and 2, the fishing jig eye cleaner of the present invention has a top strip 10 and a bottom strip 20. The top strip 10 has a first, obtuse bend 17 which distinguishes an end portion 11 from an angled portion 12 and a second, nearly right-angle bend 18, in the opposite direction to bend 17, which creates a top tab 13 on the angled portion 12. The bottom strip 20 also has an obtuse bend 27 and a nearly right-angle bend 28 which separates the bottom strip 20 into an end portion 21, an angled portion 22, and a bottom tab 23.

Top or inner tab 13 and bottom or outer tab 23 begin at respective bends 18 and 28 which are different distances from respective obtuse bends 17 and 27. Top tab 13 is closer to bend 17 than bottom tab 23 is to bend 27, so that top tab 13 passes behind and substantially parallel to bottom tab 23 and is spaced from bottom tab 23 at slightly less than the length of a standard jig eye. Different spacing may be provided for various eye sizes.

A tapered point 15 is formed at the center of the free edge 14 of the top tab 13 on the top strip 10. An opening 25 is formed at a location on a line parallel to the path of the point 15, normally at the center of the bottom tab 23 on the bottom strip 20. The strips 10 and 20 are joined at their adjacent end portions 11 and 21 using known means so that the angled portions 12 and 22 form an acute angle between them. A plastic coating 30 is preferably applied to the two strips 10 and 20 covering the joined end portions 11 and 21 and partially covering the angled portions 12 and 22.

To operate the invention, the eye of the fishing jig or hook (not shown) is inserted into the opening 25 so that the eye is substantially parallel to the angled portion 22 of the bottom strip 20. Applying pressure to the angled portions 12 and 22 causes point 15 to pass behind, substantially parallel to, and across the entire width of opening 25. When the jig eye has been inserted into opening 25, the point 15 will pass through the eye thereby punching out paint or plastic which may be blocking the eye. Because point 15 is tapered, it is capable of clearing jig eyes of various sizes as long as they are large enough for the tip of point 15 to pass through them yet small enough to be properly positioned through the opening 25 in the path of point 15. When released, angled portions 12 and 22 and tabs 13 and 23 spring back to their original positions, so that point 15 does not obstruct the opening 25 and the eye of the fishing jig or hook may be removed.

Although the invention has been described as being composed of two strips, it could alternatively be made out of one strip which has been bent to create the end portions 11 and 21, angled portions 12 and 22, and tabs 13 and 23 previously described. Also, if the invention is formed from a single strip, the angled portions 12 and 22 may meet directly so that there are no end portions 11 and 21. In general, the invention contemplates any device which has two tabs 13 and 23 previously described which can be brought together so that the point 15 of the inner tab 13 passes substantially parallel to, behind, and across the entire width of the opening 25 in the outer tab 23 at a distance substantially equal to the length of a jig eye or fish hook eye.

As used in the claims a fishing jig includes any lure, hook, jig or the like which has a projecting eye.

What is claimed is:

1. A work piece comprising a fishing jig having a generally circular eye to be cleared of obstruction, in combination with a device for clearing a projecting eye on a work piece, said eye being generally circular and having a center area intended to be open, said clearing device comprising a tong-like device with two strip portions each having a free end and an end where the two strip portions are joined to each other and capable of approaching each other at their free ends, an inner tab and an outer tab at the free ends of respective strip portions, each said tab being substantially perpendicular to the respective strip portion of which it is a part;

said tabs being positioned so that when said strip portions are pressed towards each other, the inner tab passes behind and substantially parallel to the outer tab at a distance equal to the distance to the center of said eye of said fishing jig;

said inner tab having a projecting point formed on its free edge sized to fit within said eye;

said outer tab having an opening through which the eye which is to be cleared may be inserted;

said opening being located in a plane including the path the point takes when it passes behind said outer tab;

whereby when said eye of said workpiece is in said opening and said strip portions are pressed towards each other, said point and said inner tab passes behind, substantially parallel to, and across the entire width of said opening and the said point passes through said eye inserted in said opening;

said strip portions being joined so that when said strip portions are released, said strip portions return to their original positions and said point located on said inner tab does not obstruct said opening in said outer tab.

2. The device of claim 1 where the opening in the outer tab is a hole.

3. The device of claims 1 or 2 where the two strip portions are joined by welding.

4. The device of claims 1, 2, or 3 where the point located on the inner tab has tapered sides.

5. The device of claims 1, 2, 3, or 4 where the end where the two strip portions are joined to each other is coated with plastic.

* * * * *